Dec. 6, 1932.  E. B. MILLER  1,889,973
CHAMBER PROCESS OF MANUFACTURING SULPHURIC ACID
Filed June 6, 1924   2 Sheets-Sheet 2
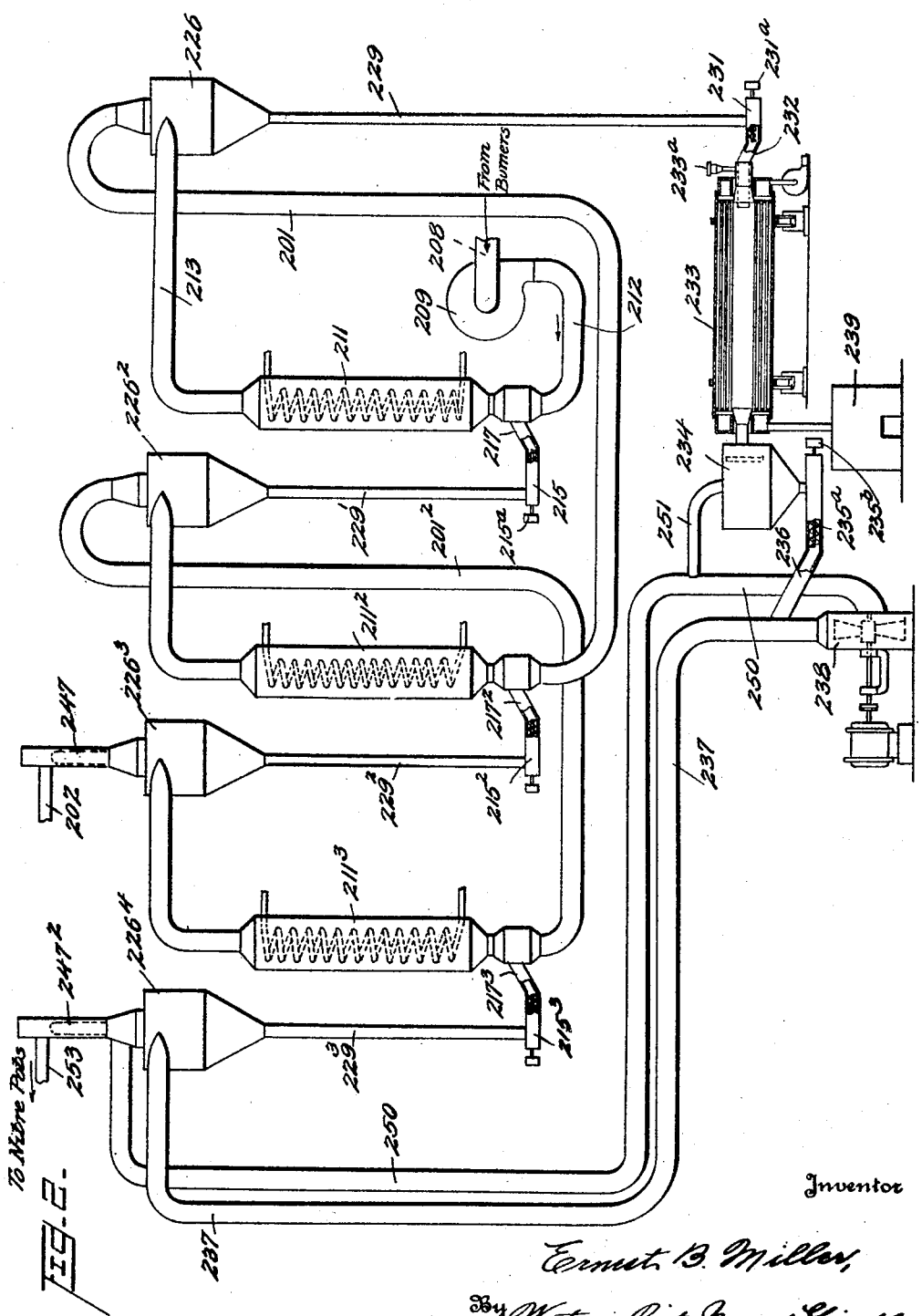

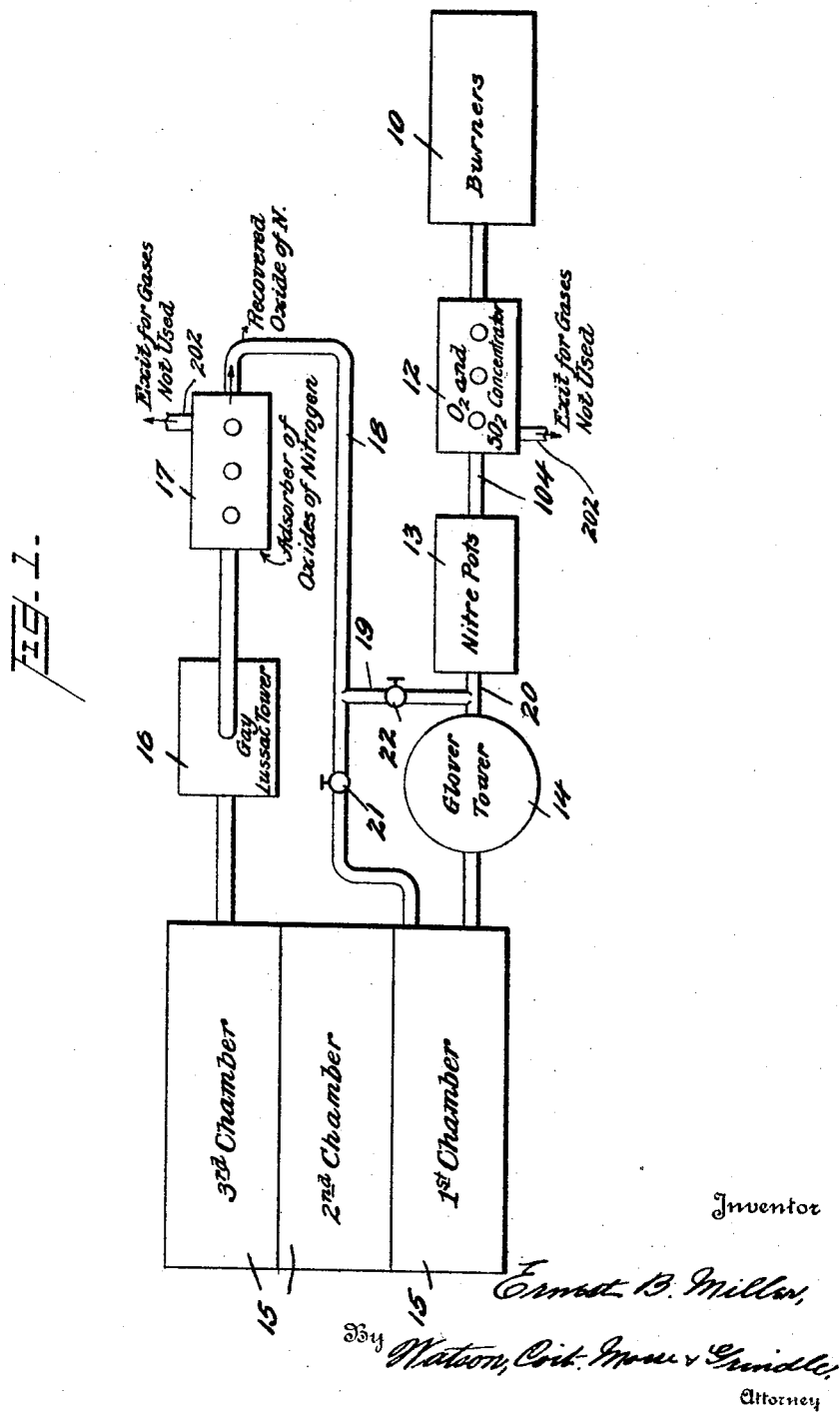

Patented Dec. 6, 1932

1,889,973

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

CHAMBER PROCESS OF MANUFACTURING SULPHURIC ACID

Application filed June 6, 1924. Serial No. 718,372.

The present invention relates to the manufacture of sulphuric acid by the chamber process.

The principal objects of the invention are to increase the production of acid per cubic foot of chamber space and render it possible to use supplies of sulphur dioxide hitherto allowed to go to waste because the concentration of sulphur dioxide is too low to be economically used in the process.

To these ends the invention consists in increasing the concentration of the sulphur dioxide supplied to the plant, or increasing the concentration of the oxides of nitrogen employed, or effecting both these results.

Other objects and features of novelty will be apparent from the description taken in connection with the drawings, in which:

Figure 1 is a diagrammatic view of a plant for manufacturing sulphuric acid by the chamber process; and Figure 2 is a diagrammatic view of a concentrator or absorber which may be employed with the plant for practicing the present invention.

In the chamber process of manufacturing sulphuric acid, a mixture of sulphur dioxide and air from the burners is supplied to the Glover tower. A sufficient amount of air must be used in burning the sulphur or ore so that there will be left in the gases at least enough oxygen to effect the oxidation of the $SO_2$. If brimstone is used the theoretical maximum of $SO_2$ in the burner gases is 13.3%. If this limit is exceeded, it will be impossible to obtain complete conversion in the chambers as there will be a deficiency of oxygen. In practice, whether sulphur or pyrites is used, the sulphur dioxide in the burner gases seldom exceeds 8% and is often less. The usual mixture having about 7% $SO_2$ contains only about 12% oxygen. If it is attempted to increase the $SO_2$, there will result a proportional decrease in the oxygen.

As previously stated, one of the objects of the present invention is to increase the production of sulphuric acid per cubic foot of chamber space by using in the chamber higher concentrations of sulphur dioxide than have been employed heretofore. This result may be attained even with a gas as low in sulphur dioxide as 2% by volume so that another object of the invention is to render available large supplies of dilute sulphur dioxide which have been heretofore allowed to go to waste. According to the present invention, the $SO_2$ is adsorbed from a mixture of $SO_2$ and air (from any source), and thereafter the substantially pure $SO_2$ is diluted with new or fresh air to obtain any desired concentration of $SO_2$ and air.

For the purpose of increasing the concentration of sulphur dioxide in a mixture of gases, it may be adsorbed in a porous material and then liberated with air in any desired proportion. The theoretical maximum concentration which may be employed in the chambers is 28% by volume. Preferably, a porous material such as silica gel is employed for adsorbing the sulphur dioxide and concentrating the same. This silica gel is a hard porous material having ultra-microscopic pores. One method of testing materials to compare the pore sizes consists in determining the amount of water vapor that the material will adsorb at a low partial pressure and given temperature. The silica gel preferably employed has such fine pores that it will adsorb water vapor to such an extent as to contain about 21% of its own weight (dry) of water when in equilibrium with water vapor at 30° C. and a partial pressure of 22 mm. of mercury. Other materials having a similar porous structure may be employed such as gels of stannic oxide, tungstic oxide, aluminum oxide, etc. An apparatus 12 for effecting this concentration may be interposed in the system between the burners 10 and the nitre pots 13. An example of such an apparatus is shown in Figure 2.

Referring to Figure 2 of the drawings, the mixture of gases having the sulphur dioxide to be concentrated enters the apparatus at 208, this conduit being in communication with the intake of a blower 209. This blower through pipe 212 feeds the gases to the adsorbing chamber 211. The flow of gases through the various adsorbing units is effected by said blower 209. The adsorbing material, such as silica gel, in powdered form, is fed into the stream of gases from the pipe 217. The mixture of adsorbing material and gases is discharged from the chamber through pipe 213 into a continuously acting separator 226 wherein the adsorbing material is separated from the gases. The gases separated by the separator 226 are conveyed by a pipe 201 to a second adsorbing chamber $211^2$. Pulverized adsorbing material is fed into the stream of gases entering this second chamber from pipe $217^2$. The adsorbing material is separated from the mixture discharged from this chamber by means of a continuously acting separator $226^2$, the adsorbing material falling through pipe 229' to conveyor 215 discharging into pipe 217 and the gases being conveyed by pipe $201^2$ to a third adsorbing chamber $211^3$. The pulverized adsorbing material is fed into the stream of gases entering this third chamber from pipe $217^3$, and is separated from the mixture discharged from the chamber by means of the continuously acting separator $226^3$. The adsorbing material falls through pipe $229^2$ to the conveyor $215^2$ discharging into pipe $217^2$ while the gases pass through a bag separator 247 and are discharged into the atmosphere through pipe 202. The bag separator prevents any of the adsorbing material from being lost. At intervals it is shaken and any adsorbing material collected thereby falls through the separator $226^3$ and then into the conveyor $215^2$.

The adsorbing material separated by separator 226 falls through pipe 229 to a conveyor 231. It may be fed by this conveyor into an activator 233. This feed may be effected with an improved device which prevents flow of gases in either direction. Thus the conveyor 231 comprises a worm in a horizontal pipe connected with an upwardly inclined section of pipe 232, which discharges into the activator. As shown, the worm conveyor is provided with a pulley $231^a$ or other suitable means whereby it may be rotated. In operation the conveyor feeds the adsorbing material toward the activator, filling up the inclined pipe 232. There being no conveyor in this inclined piece of pipe, the adsorbing material is forced into the activator at the upper end of this pipe by the pressure on the material exerted by the worm conveyor. The inclined pipe 232 being filled with adsorbing material acts as a seal to prevent passage of gases in either direction.

A like feeding device is provided in connection with each one of the chambers 211, $211^2$ and $211^3$ for feeding the adsorbing material into the stream of gases. Thus the pipe 229' supplies the worm conveyor 215 driven through pulley $215^a$, and said conveyor is in communication with an upwardly inclined pipe 217 which discharges into the stream of gases.

In a similar manner the pipe $229^2$ supplies the worm conveyor $215^2$ adapted to force the adsorbing material upwardly through the inclined pipe $217^2$. Likewise the pipe $229^3$ discharges into a horizontal conveyor $215^3$ which forces the adsorbing material upwardly through the inclined pipe $217^3$ into the stream of gases. In each case the material in the inclined pipe acts as a seal to prevent passage of gases. The activator may be of any suitable design. As shown, it comprises a rotating chamber into which the gel is fed and the adsorbed gas liberated by heating the gel, an adjusted quantity of air being admitted to the activator through pipe $233^a$ so that any desired concentration of the adsorbed gas may be obtained in the mixture recovered from the activator.

From the activator 233 the adsorbing material is discharged into a settling chamber 234 which supplies adsorbing material to the horizontal pipe having the worm conveyor $235^a$ driven by means connected with the wheel or pulley $235^b$. The conveyor $235^a$ forces the adsorbing material upwardly through an inclined pipe 236 discharging the same into the pipe 237 which is in communication with a fourth continuous separator $226^4$. The flow of the gases and adsorbing material is effected in pipe 237 by means of a blower 238 which discharges into the conduit 237. It will be seen with this arrangement of the fan 238 and the device for feeding the adsorbing material into the conduit 237, the adsorbing material does not come in contact with the blades of the fan or blower and consequently the life of the fan is much longer than where the silica gel passes directly through the fan.

The gas outlet of the separator $226^4$ is connected to the intake of blower 238 by a pipe 250 so that some of the gases are used over and over to raise the silica gel in pipe 237 without the admission of additional air or gas at the intake of blower 238.

The top of the settling chamber 234 is connected by pipe 251 to the pipe 250 so that the mixture of air and gas liberated from the pores of the adsorbent will be conveyed to the inlet of fan 238.

The concentration of the sulphur dioxide in the mixture of gases is controlled by the amount of air admitted at $233^a$.

The heat for liberating the sulphur dioxide adsorbed in the pores of the adsorbent may be supplied from a furnace 239 in communication with the activator 233.

The mixture of gases separated from the adsorbent by the separator $226^4$ passes through a bag separator $247^2$ and then is delivered through the exit pipe 253 into the conduit 104 which delivers the mixture to the nitre pot chamber 13 of the sulphuric acid plant.

In this manner a mixture of gases containing sulphur dioxide, even with very low concentration, may be treated so that the sulphur dioxide concentration is increased to any desired amount, but in usual practice the concentration will be less than the theoretical maximum of 28% by volume.

In the chamber process of manufacturing $H_2SO_4$ provision is made for the introduction of oxides of nitrogen or nitric acid. Usually these oxides are introduced between the burners and the Glover tower 14 by "potting" sodium nitrate, that is, treating it with sulphuric acid and mixing the resulting vapors with the burner gases. The oxides of nitrogen act catalytically to convert $SO_2$ to $H_2SO_4$ in the presence of moisture and oxygen, in the Glover tower and chambers.

From the Glover tower the gases pass successively through a series of large lead chambers 15, usually four to eight in number where the oxidation of sulphur dioxide to sulphuric acid proceeds slowly in the presence of oxygen, water and oxides of nitrogen. The chemical reactions taking place here may be approximately represented as follows:

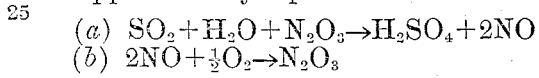

(a) $SO_2 + H_2O + N_2O_3 \rightarrow H_2SO_4 + 2NO$
(b) $2NO + \tfrac{1}{2}O_2 \rightarrow N_2O_3$ The lead chambers are very large, the average production of acid in the entire series of chambers being about 375 pounds of 50° Bé. acid per day per 1,000 cubic feet of chamber space. The necessity of this large chamber space appears from the following:

It will be seen from the foregoing reaction (a) that the rate of formation of sulphuric acid is a function of the concentration of sulphur dioxide in the reaction mixture and this concentration, of course, diminishes progressively as the gases pass through the chambers.

The higher oxides of nitrogen reduced according to reaction (a) to NO must be re-oxidized according to reaction (b) before they can serve to produce more sulphuric acid according to reaction (a). There is a pronounced time factor involved in reaction (b) even when the concentration of oxygen is high and in the chambers the concentration of oxygen decreases from chamber to chamber.

The gases issuing from the last chamber contain practically no sulphur dioxide, but contain all the oxides of nitrogen not dissolved in the acid produced in the chambers. In order to recover the oxides of nitrogen in these exit gases, they are made to pass through a Gay Lussac tower 16 where they are partially dissolved in 60° Bé. sulphuric acid flowing down through the tower. That portion of the oxides so dissolved is re-introduced into the system by circulating this acid through the Glover tower. There are two losses of nitre, one from the top of the Gay Lussac tower and the other the portion dissolved in the acid in the chambers. The first of these wastes of nitre amounts to approximately two-thirds of the entire amount consumed in the lead chamber plant.

The large losses of nitre in the exit gases from the Gay Lussac tower have heretofore prevented the use of oxides of nitrogen beyond a certain concentration, experience having shown that under present conditions there is a maximum beyond which it is not economical to go.

According to the present invention, however a greater concentration of oxides of nitrogen may be employed than heretofore because substantially all waste of these oxides from the top of the tower is eliminated by recovering the oxides of nitrogen that would ordinarily escape and re-introducing them into the system. Preferably, this is accomplished by employing an adsorber 17 of the same construction as shown in Figure 2 of the drawings. This adsorber has its inlet end in communication with the top of the Gay Lussac tower so that all gases issuing from the top of the tower pass through the adsorber wherein the oxides of nitrogen are adsorbed and then liberated in any desired proportion with air and delivered by means of the pipe 18 either into the first of the lead chambers or by means of pipe 19 into the pipe 20 connected to the Glover tower. Valves 21 and 22 are provided for controlling these pipes 18 and 19.

Having thus described my invention what I claim as new and desire to secure by Letters Patent is:

1. In the manufacture of sulphuric acid by the chamber process, the step of adsorbing in a porous material oxides of nitrogen escaping from the system, separating the oxides from the material and returning said oxides in gaseous form and said porous material to the system.

2. In the manufacture of sulphuric acid by the chamber process, the step of adsorbing in a porous material having pores of substantially the same size as in silica gel, oxides of nitrogen escaping from the system, liberating the oxides from the material and returning said oxides in gaseous form and said porous material to the system.

3. In the manufacture of sulphuric acid by the chamber process, the steps of adsorbing in silica gel, oxides of nitrogen escaping from the system, liberating the oxides adsorbed by the gel and returning said oxides in gaseous form and said gel to the system.

4. In the manufacture of sulphuric acid by the chamber process, the steps of adsorbing sulphur dioxide in a solid adsorbent, liberating the sulphur dioxide from the material mixed with a predetermined proportion of air, delivering the mixture of air and sulphur dioxid to the Glover tower, recovering oxides of nitrogen escaping from the Gay Lussac tower in a solid adsorbent, separating such oxides of nitrogen from said adsorbent, and returning such oxides in gaseous form and said adsorbent to the system.

5. In the manufacture of sulphuric acid by the chamber process, the steps of adsorbing sulphur dioxide in silica gel, liberating the sulphur dioxide from the gel mixed with a predetermined proportion of air, delivering the mixture of air and sulphur dioxid to the Glover tower, recovering oxides of nitrogen escaping from the system by adsorption in silica gel, separating such oxides from said silica gel, and returning such oxides in gaseous form and said silica gel thereto.

In testimony whereof I hereunto affix my signature.

ERNEST B. MILLER.